United States Patent [19]

Moe et al.

[11] 4,081,145
[45] Mar. 28, 1978

[54] FOOD CUTTING MACHINE

[75] Inventors: Walter Moe, Los Angeles, Calif.;
Charles Michael Diker, New York,
N.Y.; Lawrence Allen Bernstein, Los
Angeles, Calif.

[73] Assignee: Diker-Moe Associates, Los Angeles,
Calif.

[21] Appl. No.: 788,334

[22] Filed: Apr. 18, 1977

[51] Int. Cl.² .............................................. A47J 43/25
[52] U.S. Cl. .................................. 241/93; 241/169.1;
241/285 R; 248/362
[58] Field of Search ............. 241/93, 168, 169, 169.1,
241/277, 285 R, 285 A; 408/76; 248/206 R,
362, 363

[56] References Cited

U.S. PATENT DOCUMENTS

| 1,840,400 | 1/1932 | Lebherz | 248/362 |
| 2,145,421 | 1/1939 | Jungbecker | 241/93 X |
| 2,596,604 | 5/1952 | Schaeffer | 241/93 X |
| 2,713,367 | 7/1955 | Aberer | 248/206 UX |
| 3,635,270 | 1/1972 | Petroske et al. | 241/93 X |
| 3,675,886 | 7/1972 | Kampmier | 248/363 |

*Primary Examiner*—Roy Lake
*Assistant Examiner*—Howard N. Goldberg
*Attorney, Agent, or Firm*—Ralph M. Braunstein

[57] ABSTRACT

A food-cutting machine for slicing, grating or shredding foodstuffs such as fruits, vegetables, meats or cheeses. The device is designed particularly for home kitchen use and features a hollow body or housing, the interior of which is adapted to storage of a set of stacked or nested cutters having blades for producing different cuts in various food items. The housing latches to a suction base by means of a cam lock operated by a lever which also operates the suction disc of the base. When the housing is latched to the base, the base is simultaneously fastened to an appropriate work surface by the suction of the disc. When the lever is raised to unlatch the housing, the suction is released so that the device may be moved to another location.

2 Claims, 6 Drawing Figures

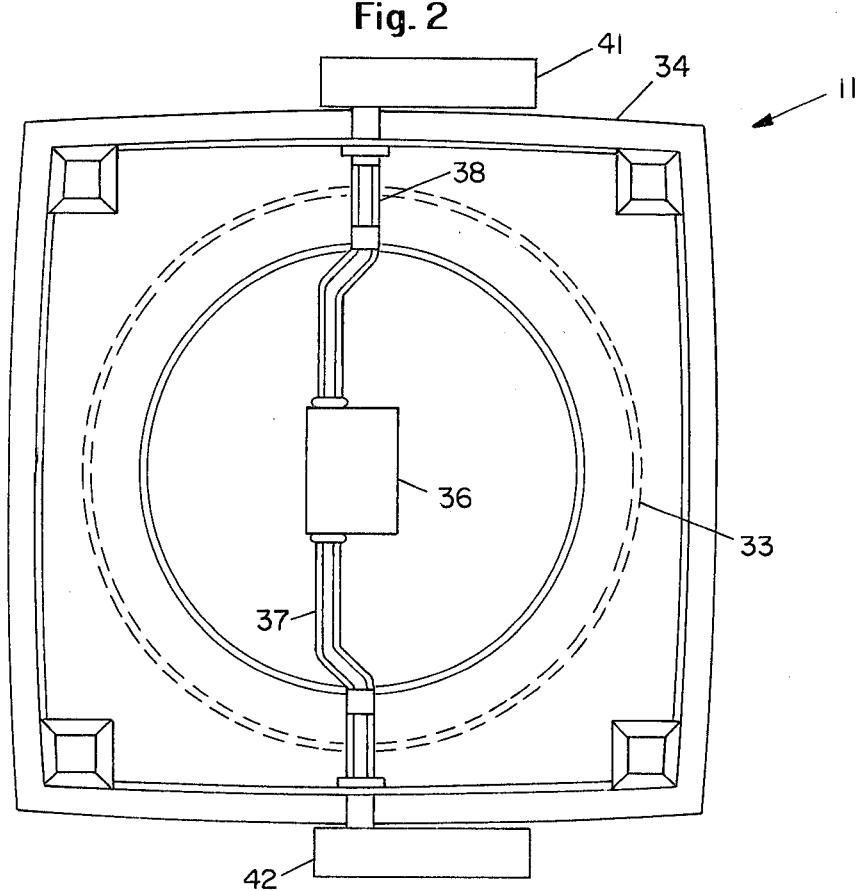
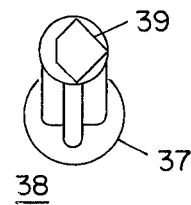
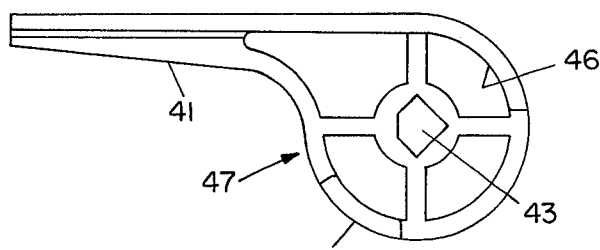
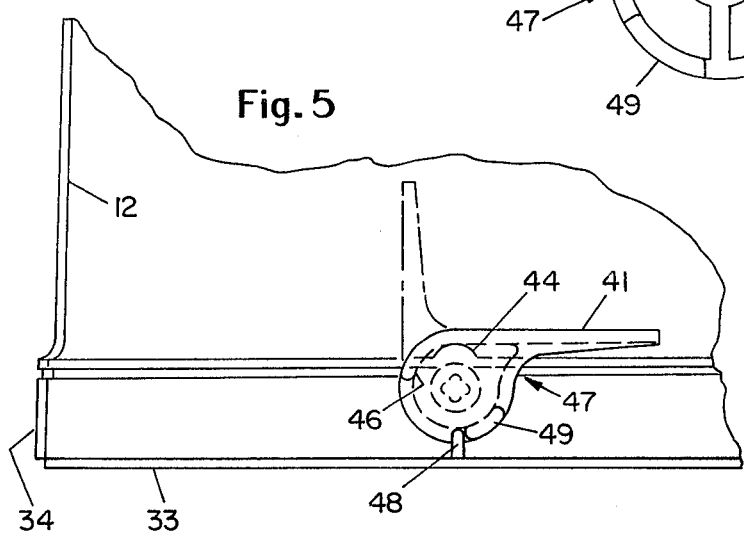
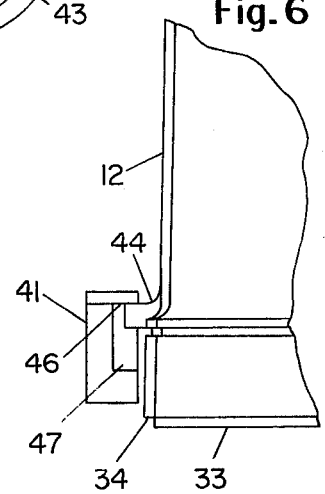

FOOD CUTTING MACHINE

BACKGROUND OF THE INVENTION

Hand-operated food cutting machines employing rotary cutting elements have been available for many years. Devices which have proved popular may be equipped with one of a number of interchangeable cutting elements, each having a different type of blade for producing particular kinds of cutting patterns in a variety of food materials. For example, specific cutting elements may grate, shred, slice, ripple-cut or julienne fruits and vegetables to provide the cook with food processed to an assortment of attractive textures, particle sizes and decorative configurations.

In the home kitchen, food cutting machines of the type to which the invention relates are often used only occasionally rather than continuously. Most commonly, perhaps, they are taken from a storage place and used to perform a single food processing step with a specific cutting element which the housewife must first locate among her array of generally loose and odd-shaped utensils and accessories. The device must then be placed in a suitable position for use, preferably fastened securely to a work surface, so that both of the operators hands are available, one to rotate the cutting element and the other to feed the material being processed to the blades.

OBJECTS OF THE INVENTION

The objects of this invention include providing a food cutting machine with integral and compact means for storing a set of accessory cutting elements, and for fastening the cutting machine to a work surface.

SUMMARY OF THE INVENTION

The invention comprises a food cutting machine having a base adapted to fasten to a suitable work surface by means of a suction disc, and a main housing adapted at its bottom end to engage the top of the base and at its top end to support a rotary cutting element with associated drive mechanism and a hopper for delivering foodstuff to the cutter as it is turned. The main housing is hollow and of a size and shape to provide an interior space for storing a set of interchangeable rotary cutting elements. The storage space opens at the bottom end of the housing to give access to the stored cutters. When the cutting machine is in use, the main housing is locked to the top of the base by operation of a lever which also actuates the suction disc to secure the base to a work surface. Conversely, when the suction disc is actuated to prevent movement of the cutting machine base during use, the main housing is simultaneously locked to the base to provide rigid support against the forces exerted by the operator turning the drive means and pushing foodstuff against the cutting element. Storage of unused cutting elements inside the housing reduces the likelihood of their being lost or damaged or interfering with other operations or activities going on in the food preparation area, and keeps them readily accessible when their use is desired.

BRIEF DESCRIPTION OF THE DRAWINGS

In the accompanying illustrative drawings of a preferred embodiment, from which may be derived a complete understanding of the objects and advantages which flow from the inventive concept.

FIG. 2 is a top view of the base of the embodiment shown in FIG. 1;

FIG. 3 is a detailed end view of the suction disc operating rod shown in FIG. 2;

FIG. 4 is a side view of a lever adapted to operate the rod shown in FIG. 2 and to engage a cam following surface extension on the sides of the main housing depicted in FIG. 1;

FIG. 5 is a detail view of the lever shown in FIG. 4 as it engages the cam following surface extension of the housing depicted in FIG. 1; and FIG. 6 is a side detail view of the cam and lever arrangement shown in FIG. 5.

DETAILED DESCRIPTION OF THE PREFERRED EMBODIMENT

Figure 1:
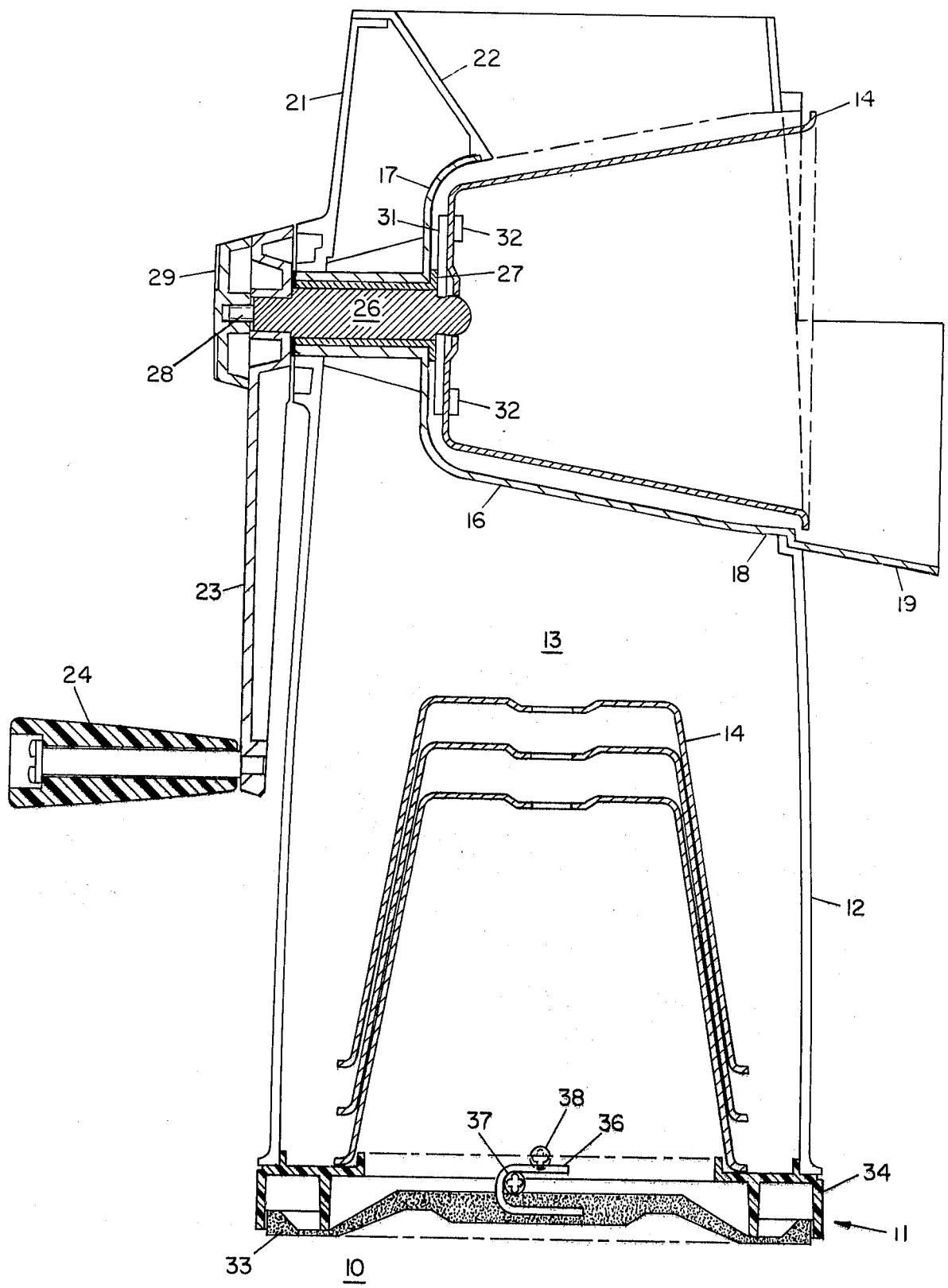
FIG. 1 is a vertical cross-section of a fully assembled food cutting machine embodying the invention.

The food cutting machine 10 illustrated in FIG. 1 has a suction base 11, a top view of which is shown in FIG. 2. The base 11 is adapted at its bottom to grip by suction the generally smooth top of an appropriate work surface and at its top to engage matingly and support a main housing 12 which typically forms the body of the machine 10. Housing 12 has a hollow interior space 13 of a size and shape adapted to receive and hold one or more of the interchangeable rotary cutting elements such as element 14 which may be used with the machine 10 to produce particular types of food cutting action. The bottom end of main housing 12 is open to permit the insertion and removal of cutting elements being stored therein, and is adapted to engage matingly with the top of base 11. Main housing 12 is adapted at its top end to receive and support an upper housing 16 which defines a cutting chamber in which a selected cutting element 14 is mounted for rotation to perform the desired food cutting action. Upper housing 16 in the illustrative embodiment is conically flared from a closed smaller end 17 to an open larger end 18. This shape accommodates transversely frusto-conical cutting element 14 which is adapted to facilitate the movement of cut pieces of food toward the open end of cutter 14 where it falls onto a deflector 19 designed to carry it away from the side of cutting machine 10 to a conveniently positioned container, not shown. A top housing 21 forms the uppermost part of cutting machine 10 and includes a hopper 22 through which food is passed to the rotary cutting element 14. Passage of food through hopper 22 may be assisted by a pusher, not shown, which typically takes the form of a wood block conforming generally to the shape of the space defined by the walls of hopper 22 and the curved outer surface of cutting element 14.

Cutting element 14 is turned by means of a crank 23 which has a handle 24 at its free end to provide a convenient gripping surface. The other end of crank 23 is provided with a hole adapted to engage one end of a drive shaft 26 which is journaled in a bushing 27 held in upper housing 16 at its smaller end. The end of shaft 26 which carries crank 23 is provided with a threaded extension 28 adapted to be engaged by a matingly threaded cap 29 which serves to fasten crank 23 to shaft 26 as well as to hold shaft 26 in proper longitudinal position in bushing 27. The other end of shaft 26 extends through the small end of upper housing 16 and carries a drive disc 31 which is provided with protrusions or stakes 32 adapted to engage correspondingly placed slits in the bottom of cutting element 14 in a manner which locks cutter 14 to the drive train during normal use of cutting machine 10, and yet permits easy removal when it is desired to clean the machine after use or to change to a different cutting element to produce a different kind of cut.

Base 11 comprises a flexible suction disc 33 mounted in a rigid frame member 34. The top surface of suction disc 33 is equipped with a centrally positioned lift hook 36 adapted to be engaged by an offset center portion 37 of a rod 38. The axial end segments of rod 38 are journaled to bushings affixed to opposite sides of base frame 34 so that rotation of the rod 38 moves the offset center portion 37 through a circular arc. Such motion is adapted to raise and lower the hook 36 and hence the central portion of suction disc 33, thereby expanding and contracting the space beneath the disc to make and release a partial vacuum which holds the base to a suitably smooth work surface.

The tips 39 of rod 38, as illustrated in FIG. 3, are adapted to engage levers 41, 42 which are shaped to facilitate convenient operation by the fingers of the user of cutting machine 10. A positive, non-slip connection between levers 41, 42 and rod tips 39 is ensured by providing a generally square cross-section to the rod tips 39 and to the corresponding holes 43 in the levers. Additionally, a unique orientation of the levers 41, 42 with respect to rod 38 is determined by providing an asymmetry to the cross-sections of both rod tips 39 and holes 43. As illustrated in FIGS. 3 and 4, the asymmetry takes the form of a flattened corner of the generally rectangular cross-sections. It is preferred to orient the levers 41, 42 on rod 38 so that they will provide visual indications as to whether the suction disc is in the "up" or "locked" or in the "down" or "unlocked" position. Thus, when the levers 41, 42 are in the horizontal position, the center portion of suction disc 33 is in the "up" position, locking the base by suction to the supporting surface, and the bosses 44 are engaged with cam surfaces 46 to lock the main housing 12 to the base 11. When the levers 41, 42 are in the vertical position, the suction disc 33 is in the "down" position freeing the base from suctional engagement with the supporting surface, and the bosses 44 are aligned with openings 47 to permit the main housing 12 to be removed from base 11.

In accordance with the principles of the invention, levers, 41, 42 serve not only to rotate rod 38 about its axis and thereby to operate and release suction disc 33, but also to latch or lock main housing 12 to base 11 when disc 33 is in its operated or suction position and to release main housing 12 from base 11 when suction disc 33 is in its release position. This is accomplished in the illustrative embodiment by means of a pair of cam following protrusions or bosses 44 on opposite sides of the bottom of main housing 12, as shown in FIGS. 5 and 6. Bosses 44 are adapted to engage interior cam surfaces 46 formed on the inside of levers 41, 42 so that as levers 41, 42 are turned to operate suction disc 33, cam surfaces 46 slide over bosses 44 and pull main housing 12 tightly down onto base frame 34. When levers 41, 42 are turned to release suction disc 33, cam surfaces 46 slide off of bosses 44 which are ultimately aligned with openings 47 to permit the bosses 44 to move upward without interference as main housing 12 is lifted from base 11. If desired, the rotation of rod 38 by levers 41, 42 may be limited to an optimum locking position by means of a boss 48 on base frame 34 in conjunction with a stop button 49 on the inside of levers 41, 42. It will be appreciated that in order for levers 41, 42 to point in the same direction when mounted on opposite ends of rod 38, they will not be identical but will be in effect mirror images of each other.

While the invention has been described by reference to a specific illustrative embodiment it will be appreciated that many variations and modifications are possible and may be made by those skilled in the art without departing from its scope and spirit.

We claim:

1. A hand operated food cutting machine comprising:
   an upper housing defining a transverse conical flared cutting chamber having a closed smaller end, an open larger end, and a top opening;
   a drive shaft transversely journaled for rotation coaxial with the cutting chamber, one end of the drive shaft extending into the smaller end of the cutting chamber and being adapted to removeably engage a rotary cutting element, the other end of the drive shaft extending outside the smaller end of the cutting chamber and being adapted to be engaged by a hand-rotatable crank;
   a hand-rotatable crank coupled to the end of the drive shaft extending outside the smaller end of the cutting chamber, for imparting rotary movement to the cutting element;
   a top housing on top of the upper housing and having side walls defining a hopper for directing foodstuff to the top opening of the cutting chamber;
   a main housing supporting the upper housing, having a hollow interior adapted to receive for storage a stack of frustoconical rotary cutting elements, and having a bottom end adapted removably and matingly to engage a base assembly;
   a base assembly adapted at its top end removeably and matingly to engage the bottom end of the main housing and having at its bottom end a flexible suction disc operable to affix the base to a work surface;
   latch means associated with the base and the main housing and operable to form a substantially immovable releasable junction of the base to the main housing; and
   means for simultaneously operating the suction disc to affix the base to a work surface and operating the latch means to affix the main housing to the base, said means also being effective simultaneously to release the suction from the disc and to release the main housing from the base.

2. A hand operated food cutting machine as claimed in claim 1 in which the suction disc has a lift hook attached to its upper surface and which further includes:
   a bent rod having axial end portions and an offset center portion adapted to engage the lift hook of the suction disc, the axial end portions of the rod being journaled for transverse rotation and having tips adapted to receive finger operable levers for producing rotary movement of the rod about its axis between an operated position in which the offset center portion raises the lift hook of the suction disc to a maximally extended condition and a released position in which it lowers the lift hook to a minimally extended condition;
   a pair of oriented finger operable levers adapted to engage the tips of the rod and having cam surfaces adapted to produce downward movement of cam followers as the levers rotate the rod about its axis from the released to the operated position, the cam surfaces being interrupted to permit upward movement of the cam followers when the levers and rod are in the release position; and a pair of cam following bosses on opposite sides of the main housing adapted to engage and follow the cam surfaces of the levers, whereby the main housing is removable from the base when the suction disc is released and is locked to the base when the suction disc is operated.

* * * * *